No. 776,000. PATENTED NOV. 29, 1904.
A. W. TURNER.
PRINTER'S INKING AND DAMPING ROLLER.
APPLICATION FILED OCT. 24, 1903.
NO MODEL.

WITNESSES:
Fred White
Thomas Wallace

INVENTOR
Arthur Wellesley Turner,
By his Attorneys

No. 776,000. Patented November 29, 1904.

UNITED STATES PATENT OFFICE.

ARTHUR WELLESLEY TURNER, OF LONDON, ENGLAND.

PRINTER'S INKING AND DAMPING ROLLER.

SPECIFICATION forming part of Letters Patent No. 776,000, dated November 29, 1904.

Application filed October 24, 1903. Serial No. 178,373. (No model.)

*To all whom it may concern:*

Be it known that I, ARTHUR WELLESLEY TURNER, a subject of the King of Great Britain and Ireland, residing in London, England, have invented certain new and useful Improvements in Printers' Inking and Damping Rollers, of which the following is a specification.

This invention relates to printing-rollers, and has for its object to provide a roller which may be rendered hard and soft, as desired, and which possesses better qualities for the purposes of printing than rollers hitherto in use.

A roller made in accordance with my invention comprises a spindle, an india-rubber tube or bag disposed thereon and attached thereto, an external covering of calf-skin, moleskin, canvas, or other material suitable to the purposes for which the roller is intended, means for inflating the rubber tube as may be desired, and a loose sheet of parchment, waterproof paper, celluloid, aluminium, or other suitable unstretchable material disposed between the internal pneumatic tube or cushion and external covering.

Figure 1:
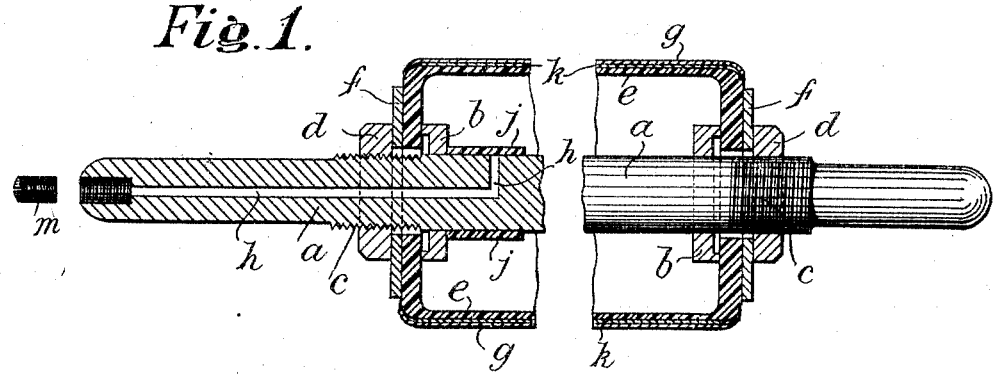
Figure 2:
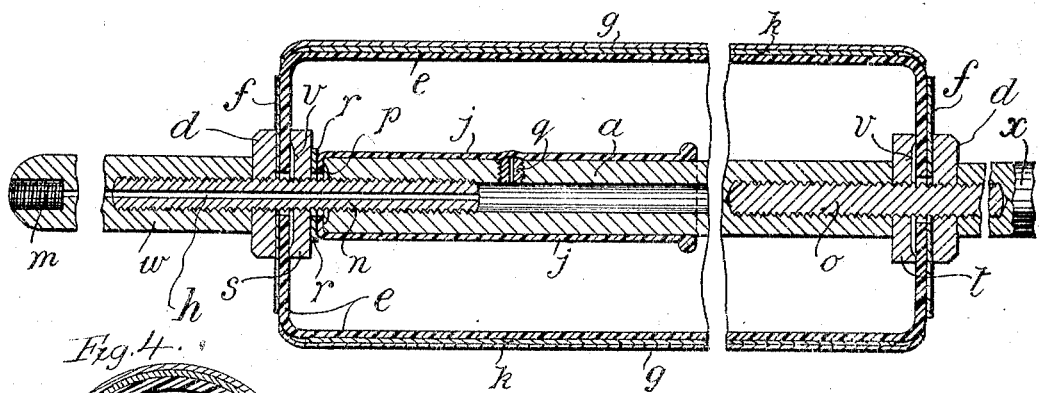
Figure 4:
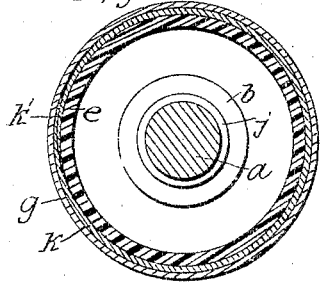
Figure 3:
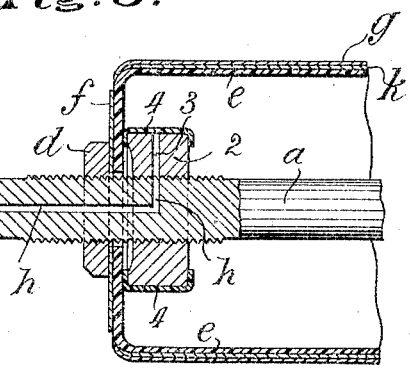

Referring now to the drawings, Figure 1 is a sectional elevation of one form of roller made in accordance with my invention. Fig. 2 is a section of a modified form thereof. Fig. 3 shows in section a different method of forming the valve. Fig. 4 is a central cross-section of the roller of Fig. 1.

$a$ is a spindle having flanges $b\ b$ disposed thereon and provided with screwed or threaded portions $c\ c$, adapted to receive nuts $d\ d$.

$e$ is an india-rubber tube or bag adapted to be secured to the spindle between the flanges $b\ b$ and the nuts $d\ d$.

$f\ f$ are washers which support the ends of the rubber tube.

$g$ is an external covering of calfskin or other suitable material.

$h$ is a hole formed in the spindle $a$, and $j$ a rubber band or valve disposed around the spindle and covering the aperture or hole $h$ inside the tube.

$k$ is a loose sheet of parchment wrapped over the inner tube, the edges of the said parchment overlapping, as indicated at $k'$, Fig. 4.

A suitable valve-plug is disposed on the spindle at $m$. Runners or fixings can be added to the said spindle to suit the various makes of printing-machines.

In a modified form, as shown in Fig. 2, the spindle $a$ is tubular and provided with threaded ends adapted to receive screwed bars $n\ o$, one of which, $n$, is tubular for the passage of air therethrough. One end of the spindle is dished as at $p$. Into the tube $a$ is screwed a hollow plug $q$, which is slightly raised above the surface thereof. A rubber tube $j$ is disposed over one end of the spindle, so as to cover the aperture in the plug $q$. The tube $j$ is gripped between the spindle $a$ and the washer $r$. The plug $q$ is slightly raised to increase the pressure of the rubber on the orifice of the plug. Flanges $s\ t$ are screwed onto the bars $n\ o$ and are preferably dished, as at $v$, for the purpose of gripping the tube $e$ and preventing the escape of air. A washer $r$ is disposed between the flange $s$ and the rubber tube $j$. The bars $n\ o$ carry extensions $w\ x$, and one of said extensions is tubular and provided with a plug $m$.

In the modification shown in Fig. 3 the flange 2 is provided with an aperture, as at 3, adapted to be in communication with the air-passage $h$. A rubber band 4 is placed over the flange, so as to cover the aperture 3 between the tube $e$ and flange 2.

When required for use, the parchment $k$ is wrapped over the tube $e$. The outer covering $g$ is slipped over the sheet $k$. The tube is then inflated to the required degree of hardness by operating an inflating device at $m$. The sheet of parchment is gripped between the inner and outer tubes and uncoils slightly to adjust itself to new conditions, and being unstretchable it distributes the pressure of the inner tube evenly over the entire tube and gives great rigidity and an even surface to the whole tube. The inner tube can be readily deflated by unscrewing the nut $d$.

A roller made in accordance with my invention has the following advantages: In the case of lithographic rollers and dampers no flannel, felt, or other packing is necessary, thereby doing away with the trouble of the skins working loose or the packing becoming hard and uneven. The skins or other covering can be slipped on or off easily by deflating the rubber tube, and the roller can be made to any degree of softness desirable. It entirely prevents the lithographic rollers skidding across the stone in the machine. As this roller can be made either hard or soft at will, it possesses better printing qualities than existing rollers. The rollers do not get punctured and are very durable and feed out ink very evenly. It will be noticed that the supporting-flanges of the roller do not extend to the inner face of the inner tube and that the ends of the inner bag or tube are molded and form a web of rubber at right angles to the spindle. This web gives elasticity at the edges of the roller, which renders the roller uniformly compressible along its whole length, an advantage not obtained in pneumatic rollers hitherto made. In the case of letter-press printing it is unnecessary to cast rollers continually, and as these pneumatic rollers always remain level and can be made as flexible as required they possess decided advantages over the composition-rollers at present in use. In color-printing the outer skins only have to be changed when a different colored ink is used.

What I claim, and desire to secure by Letters Patent, is—

1. An inking and damping roller comprising an inflatable tube, an outer cover, and a sheet disposed between the inflatable tube and the outer cover, one longitudinal edge of said sheet overlapping the other longitudinal edge and adapted to slide thereon as the inflatable tube is expanded.

2. An inking and damping roller comprising an inflatable tube, an outer cover, and a sheet of non-stretchable material disposed between the inflatable tube and the outer cover, one longitudinal edge of said sheet overlapping the other longitudinal edge and adapted to slide thereon as the inflatable tube is expanded.

3. An inking and damping roller comprising an inflatable tube, an outer cover, and a sheet disposed between the inflatable tube and the outer cover, one longitudinal edge of said sheet overlapping the other longitudinal edge and adapted to slide thereon as the inflatable tube is expanded, and a supporting-spindle upon which said inflatable tube and outer cover are carried, substantially as described.

4. An inking and damping roller comprising an inflatable tube, an outer cover, and a sheet disposed between the inflatable tube and the outer cover, one longitudinal edge of said sheet overlapping the other longitudinal edge and adapted to slide thereon as the inflatable tube is expanded, a supporting-spindle upon which said tube and covers are carried, clamping members on said spindle adapted to clamp the ends of the inner tube in position thereon, an inflating-orifice in said spindle communicating with the interior of the inner tube and an elastic sleeve disposed within the inner tube adapted to prevent the return of air therefrom to said inflating-orifice.

5. A pneumatic inking or damping roller comprising an inflatable inner tube, an outer cover, an intermediate cover of non-stretchable material disposed loosely between said tube and outer cover, a supporting-spindle upon which said tube and covers are carried, said spindle being made in three sections adapted to be united by screw-rods, an inflating-orifice extending through two of said sections and communicating with the inner tube, an elastic sleeve constituting a non-return valve from the inner tube, clamping members on said spindle within the inner tube and adapted to clamp the ends of the inner tube against corresponding members external to said tube, one end of said sleeve being turned in between one of said internal clamping members and a bearing-shoulder on the spindle, substantially as specified.

6. An inking and damping roller comprising an inflatable tube, an outer cover, and a sheet disposed between the inflatable tube and the outer cover, one longitudinal edge of said sheet overlapping the other longitudinal edge and adapted to slide thereon as the inflatable tube is expanded, a supporting-spindle upon which said tube and intermediate and outer covers are carried, and flanges on the spindle between which the ends of the tube are held, said flanges not extending to the inner face of the inner bag.

In witness whereof I have hereunto signed my name in the presence of two subscribing witnesses.

ARTHUR WELLESLEY TURNER.

Witnesses:
 ROBERT MILTON SPEARPOINT,
 H. D. JAMESON.